C. O. WOOD.
EXPANDING FRICTION CLUTCH.
APPLICATION FILED APR. 28, 1916.

1,217,258.

Patented Feb. 27, 1917.

Inventor
Charles O. Wood

By
Henry M[illegible]
Attorney

UNITED STATES PATENT OFFICE.

CHARLES O. WOOD, OF CHAMBERSBURG, PENNSYLVANIA.

EXPANDING FRICTION-CLUTCH.

1,217,258.  Specification of Letters Patent.  Patented Feb. 27, 1917.

Application filed April 28, 1916. Serial No. 94,155.

*To all whom it may concern:*

Be it known that I, CHARLES O. WOOD, a citizen of the United States, residing at Chambersburg, in the county of Franklin and State of Pennsylvania, United States of America, have invented certain new and useful Improvements in Expanding Friction-Clutches; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to friction clutches of the expanding type wherein a yielding clutching element is expanded into clutching engagement with an external non-expansible element or ring either specially made to coöperate with the expansion element, or which may be an existing non-expansible ring such as the rim of a pulley to which said expanding element is to be applied to form a friction clutch.

Referring to the drawings in which like parts are similarly designated—

Figure 1:
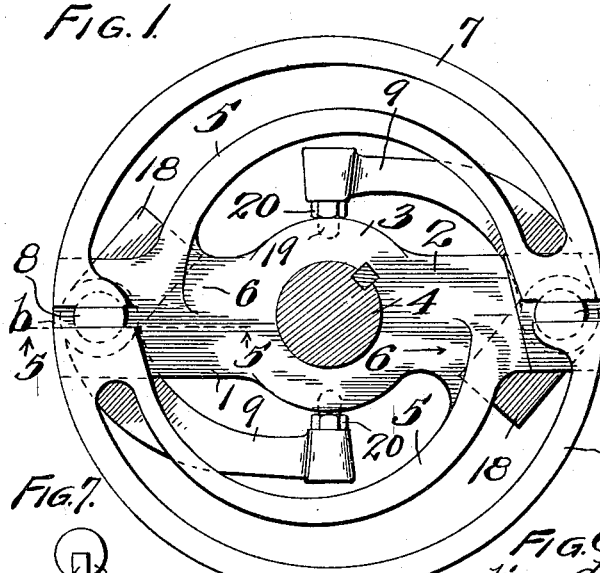
Figure 1 is a front view of the expanding member, the non-expanding member or pulley being omitted.

The expanding member is usually keyed or otherwise secured to the driving shaft, and consists of a pair of alined radial or diametrical arms 1 and 2 made in one piece with a hub 3 that fits onto the driving shaft 4. On one of these radial arms, as 1, is an expanding element consisting of two end-connected arcuate parts, the inner one, 5, joined at one end, 6, to said arm, and its other end joined to one end of the outer part 7, the other end of said outer part 7 being free, and formed for engagement by a spreader or wedge 8. This structure is duplicated for arm 2.

Figure 2:
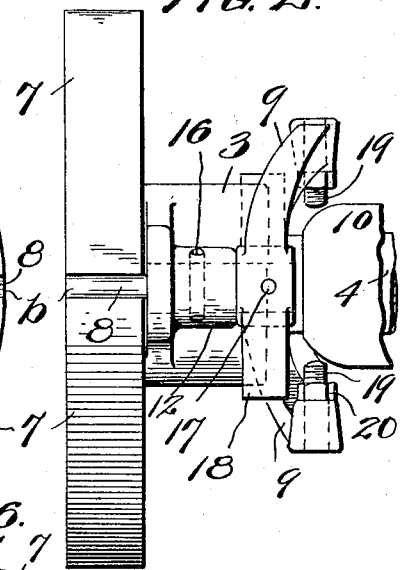
Fig. 2 is a side view thereof.
Figure 3:
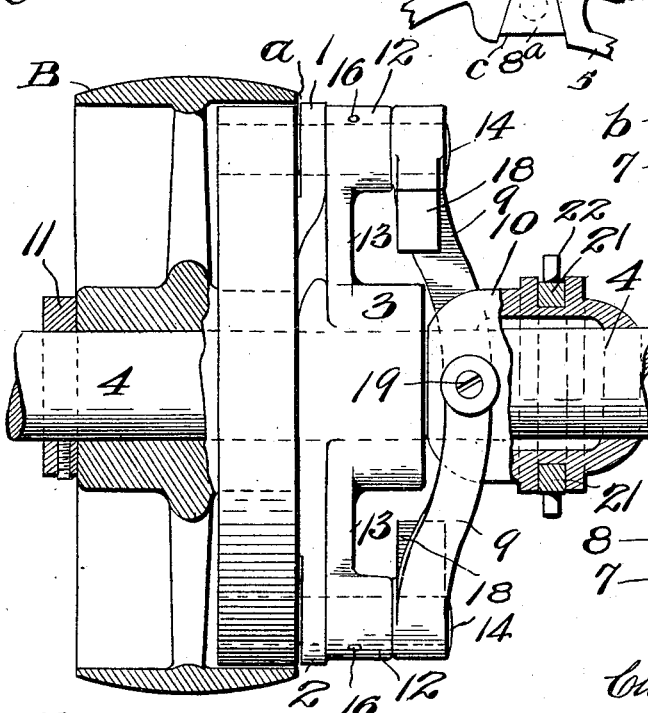
Fig. 3 is a side view at right angles to Fig. 2, showing the relation to a pulley.

The wedge or spreader 8 is mounted at the end of the arm and is slightly rotated by an actuating lever 9 arranged to be rocked by a cone 10, Figs. 2 and 3, slidable on the shaft 4.

This is the general character of clutch member to which my improvement relates, and my invention has for its object to so construct this member that its range of usefulness will be increased.

Heretofore the arms 1 and 2 were in the same plane with arcuate parts 5 and 7. This prevented the use of the clutch with an ordinary pulley, as one side of the pulley hub had to be cut away, consequently an ordinary pulley could not be used with such an expanding element.

In order to enable this to be done I have off-set the expanding elements 5, 7, from the radial arms 1, 2, and hub 3, so that the pulley hub may remain intact and pass inside the elements 5, 7, as shown in Fig. 3.

I have also made other improvements such as the manner of mounting the spreader 8, the manner of making the slots in which the spreader 8 or its equivalent operates to reduce the power required to operate the clutch, together with other details, as will hereinafter be described.

Figure 4:
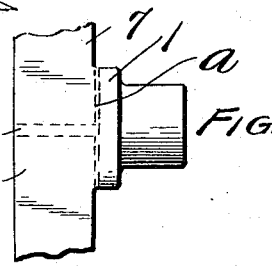
Fig. 4 is a detail view showing the manner of making the expanding member.
Figure 5:
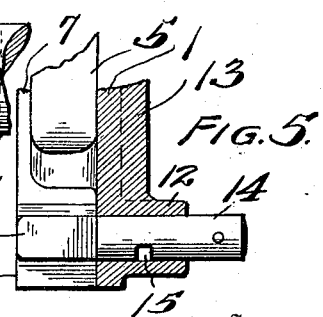
Fig. 5 is a section on line 5—5, Fig. 1.

In making the expansion member it is cast with the parts 5, 7 connected to the radial arms 1, 2, as illustrated in Fig. 4. Thereupon the expansion elements 7 are severed from the radial arms by making a narrow cut $a$ parallel to the arms, leaving the inner parts 5 connected at one of their ends to the radial arms at the points 6. I then separate the parts 7 by milling through them, as indicated at $b$, this cut being in a plane perpendicular to the plane of the cut $a$, but wider than said cut $a$. It is immaterial whether the cut $a$ or the cut $b$ be made first.

It will be noted that I make the parts 5, 7 of the expanding element concentric, where the element 5 has heretofore been of decreasing radius. This gives more spring to the elements 5, 7, makes them easier to operate, facilitates construction, and leaves the center free for the entry of the end of the pulley hub. The point of connection 6 of the inner part 5 with its radial arm is at or spaced from the hub 3 for the last mentioned purpose.

Each radial arm has near its outer end a bearing 12, from which to the central boss 3 extends a strengthening flange or web 13. This bearing 12 receives the cylindrical shank 14 of the spreader 8, which member is shaped to enter the milled slot $b$. Milled across the shank 14 is a groove 15 through which passes a pin 16 for retaining the shank in the bearing 12 while permitting rotation sufficient to enable spreader 8 to turn the extent required.

Secured by a pin 17 to the end of the shank 14 projecting beyond the bearing 12, is an operating lever having a long arm 9 and a load comprising a shorter counterbalancing arm 18. This arm 18 counteracts the centrifugal force exerted by arm 9 on the shank 14, to which the lever is secured, said shank being arranged between the two arms 9 and 18. The arm 9 is bent outwardly so that its end will clear the hub 3, as shown. In the end of the arm 9 is a screw 19 held by a jam nut 20. The screw 19 is adjustable to project more or less toward the shaft 4 for engagement with a cone 10 provided with a loose collar 21 having pins 22 by which the usual operating lever is enabled to shift the cone 10.

The operation is as follows:

When the cone 10 is slid along shaft 4 toward the hub 3 it contacts with the ends of the screws 19 in the ends of arms 9 and moves them outwardly, thus rotating the flat spreader 8, and moves the arcuate expanding elements 7 apart to frictionally engage the interior of the pulley rim. The driving shaft 4 thus drives, through the yielding clutching elements secured to it, the belt pulley B loose on the shaft 4 and retained thereon by the collar 11.

In case the device is used in a cut-off coupling, then pulley B is replaced by the usual casing and its hub, in which latter the two adjacent ends of the alined shafts project, the casing being connected to the driven shaft and the hub 3 of the expanding member being connected to the driving shaft, as is usual with such couplings.

In the above description but two radial arms 1, and 2 and their pertaining expanding elements have been described, but it is obvious that I may have any number of such arms, as two or more, the number used being simply a matter of duplication.

It will be noted that each expanding element is of a length from point 6 equal to the length of the arcuate part 5 plus the length of the arcuate part 7; that one side of the spreader 8 contacts with the junction of the two arcuate parts 5, 7, and the opposite side of the spreader contacts with the free end of a part 7.

Figure 6:
Fig. 6 is a detail front view showing a modified form of slot and the spreader therein.

The free end of the part 7 will yield easier and to a greater extent than the junction of the parts 5, 7, and in order to decrease the power required to spread the elements I preferably make the spreader eccentric to its axis of rotation so that the shorter dimension of the spreader when turned will operate the junction of the two parts 5, 7, and the longer dimension will operate against the free end of the part 7 that has the greater extent of movement. Such an arrangement is shown in Fig. 6, where the spreader $8^a$ which is substantially triangular or a trapezium, fits into a tapering slot $b'$, the lower edge $c$ being a greater distance from the center of rotation of shank 14 than the edge $d$. The inclination of the sides of the slot $b'$ also facilitates the radial or expanding movement of the expanding elements. The edge $c$ therefore moves the free end of part 7 to a greater extent than the edge $d$ will move the junction of parts 5 and 7 for equal angular movement of the shank 14.

Figure 7:
Fig. 7 is an end view of a further modification of the spreader.

In Fig. 7 I have shown the spreader $8^b$ wholly beyond the center of shank 14, so that only the free end of part 7 will be displaced thereby.

I claim—

1. In a friction clutch, an integral expansion element comprising a hub, radial arms on the hub and arcuate expanding members off-set from said arms to permit the hub of a pulley to pass within said members at their center.

2. In a friction clutch, an integral expansion element comprising a hub, radial arms on the hub, expanding members on the arms and off-set therefrom, each comprising a pair of substantially concentric arcuate parts connected together at one end, the other end of the inner part connected to an arm, said members separated from the ends of the arms by a cut parallel to the arms and members and separated from one another by a cut perpendicular to the aforesaid cut.

3. In a friction clutch, an integral expansion element comprising a hub, radial arms on the hub and expanding members on each arm, each expanding member comprising an inner and an outer arcuate part, one end of the inner part connected to one end of the outer part, the other end of the inner part being connected to an arm at a point beyond the hub and both members being off-set from said arms and hub.

4. In a friction clutch, an integral expanding element comprising a hub, radial arms on the hub and a substantially semi-circular expanding member on each arm, each member comprising two concentric parts, the inner part of each member being connected at one end to an arm at a point beyond the hub and the other end connected to the outer part.

5. In a friction clutch, an integral expanding element comprising a hub, radial arms on the hub, an expanding member on each arm, each member consisting of two substantially concentric arcuate parts, one of said parts connected at one end to an arm and at its other end to the other part, spreaders between said members and actuating levers for said spreaders, and a load for each lever to compensate for centrifugal action.

6. In a friction clutch, an integral expanding element comprising a hub, radial arms on the hub, an expanding member on each arm, each member comprising two substantially concentric parts, one end of one part connected to an arm and the other end connected to the end of the other part, and a rotatable spreader arranged between said members and eccentric to its axis of rotation.

7. In a friction element, the combination with a hub, two diametrical arms on said hub, a semi-annular expanding member on each arm off-set therefrom and from said hub, each member comprising two substantially concentric parts, the inner part connected at one end to its arm at a point beyond the hub and at its other end to an end of the other part, rotatable spreaders between said members, levers for operating said spreaders each comprising an actuating arm and a loading arm to counterbalance the centrifugal action on the actuating arm.

8. In a friction element, the combination with a hub, two diametrical arms on said hub, a semi-annular expanding member on each arm off-set therefrom and from said hub, each member comprising two arcuate parts connected at one end, the other end of the inner part connected to its arm at a point beyond said hub, and the free end of the outer part of each member having a beveled face opposite a beveled face on the end connection of the other member, a triangular spreader between said faces, an actuating lever on the spreader having an actuating arm and a compensating load on the lever.

9. The method of making an integral friction element of a friction clutch, said element including in its structure an arm, a pair of arcuate expanding members off-set from said arm, each of said members having adjacent said arm the junction point of two arcuate parts comprising a member, and the end of one of the arcuate parts of the other member; which consists in casting the friction element with said junction point, the arm and the end of said other member integral, then severing the junction point of one member from the end of the part of the other member and severing both from said arm, the planes of severance being substantially perpendicular to one another.

10. The method of making a friction clutch element, which comprises casting a radial arm having an integral arcuate part off-set from the plane of said arm, said arcuate part surrounded by a semi-annular part integral therewith and in the same plane as said arcuate part, cutting the semi-annular part through, beyond and near the terminus of the arcuate part with said semi-annular part, in a plane substantially perpendicular to the planes of said arm and semi-annular part.

11. The method of making a friction clutch element, which comprises casting a plurality of radial arms, each arm having an integral arcuate part off-set from the plane of said arms, said arcuate parts surrounded by a semi-annular part integral therewith and with said arms and in the same plane as said arcuate parts, cutting the semi-annular part through, beyond and near the terminals of the arcuate parts with said semi-annular part, in a plane substantially perpendicular to the planes of said arms and semi-annular part, and then separating said arms by cuts in a plane parallel thereto and substantially perpendicular to the first mentioned cuts, or vice versa.

In testimony that I claim the foregoing as my invention, I have signed my name in presence of two subscribing witnesses.

CHARLES O. WOOD.

Witnesses:
  W. F. BRONSON,
  C. J. ZULLINGER.

Copies of this patent may be obtained for five cents each, by addressing the "Commissioner of Patents, Washington, D. C."